(12) United States Patent
Johnson

(10) Patent No.: US 9,302,131 B2
(45) Date of Patent: Apr. 5, 2016

(54) HOLD DOWN BRACKET FOR FIRE VALVE

(71) Applicant: Ewing Johnson, Monongah, WV (US)

(72) Inventor: Ewing Johnson, Monongah, WV (US)

( * ) Notice: Subject to any disclaimer, the term of this patent is extended or adjusted under 35 U.S.C. 154(b) by 50 days.

(21) Appl. No.: 14/460,394

(22) Filed: Aug. 15, 2014

(65) Prior Publication Data
US 2015/0047859 A1    Feb. 19, 2015

Related U.S. Application Data

(60) Provisional application No. 61/866,122, filed on Aug. 15, 2013.

(51) Int. Cl.
*A62C 35/68* (2006.01)
*F16L 41/12* (2006.01)
*F16L 41/16* (2006.01)

(52) U.S. Cl.
CPC .............. *A62C 35/68* (2013.01); *F16L 41/12* (2013.01); *F16L 41/16* (2013.01); *Y10T 29/49826* (2015.01); *Y10T 137/7043* (2015.04); *Y10T 137/7062* (2015.04)

(58) Field of Classification Search
CPC .......... A62C 3/00; A62C 3/02; A62C 3/0221; A62C 31/02; A62C 31/24; A62C 35/68; F16L 41/12; F16L 55/07; Y10T 137/7043; Y10T 137/7062
See application file for complete search history.

(56) References Cited

U.S. PATENT DOCUMENTS

| 6,488,097 B1 * | 12/2002 | MacDonald, III | ..... A62C 35/68 169/16 |
| 2006/0042694 A1 * | 3/2006 | Reineck | .................. F16K 35/10 137/377 |

* cited by examiner

*Primary Examiner* — Ryan Reis
(74) *Attorney, Agent, or Firm* — Dinsmore & Shohl LLP; Monika L. Jaensson, Esq.

(57) ABSTRACT

The present invention regards a method and system for securing a discharge valve to a water line of a fire suppression system with multiple t-connections. The apparatus includes a plate, a chain, a plurality of eyehooks and a plurality of eyehook nuts. The plate has a perimeter and a central aperture sized to receive an elongated cylinder of a hose fitting of a discharge valve. The plate further has a plurality of eyehook apertures along its perimeter, with each eyehook aperture sized to receive the threaded post of an eyehook. The plate is positioned about the elongated cylinder of the discharge valve, through said central aperture, and the chains are positioned about the water line and affixed to the plate by means of eyehooks and eyehook nuts. The chain has a length sufficient to be positioned about the water line and received by the eyehooks so that plate is securely positioned along the elongated cylinder below the discharge valve nut.

6 Claims, 3 Drawing Sheets

HOLD DOWN BRACKET FOR FIRE VALVE

BACKGROUND OF THE INVENTION

The present invention regards methods and assemblies for securing discharge valves of a fire suppression system in underground mining operations, and a fire suppression system having secured discharge valves.

Underground mining operations include one or more fire suppression systems, supplying water by means of a water line (e.g., 4", 6" or 8" water line) having a metallic "t" about every 30' along such water line (an exemplary metallic "t" is shown in FIG. 1). Connected at each "t" is a 2" discharge valve for releasing water having a threaded interior (an exemplary discharge valve is shown in FIG. 1), and a fire hose fitting with a threaded exterior that is designed to matingly engage with the threaded interior of the discharge valve (an exemplary fire hose fitting is shown in FIGS. 1 and 2). Presently, in operation the discharge valve can come loose, withdrawing from the "t" upon pressure from the water line, and causing injury or death to workers and significant damage to property.

The present invention is a method and a system that inhibits the discharge valve from releasing from the "t" of the water line.

GENERAL DESCRIPTION OF THE INVENTION

The present invention includes a method for securing a discharge valve to a water line of a fire suppression system with multiple t-connections. The discharge valve has a nut, a hose fitting having an elongated cylinder, a hose fitting cap and a cap plate. The discharge valve is secured to the water line of a fire suppression system by means of an assembly of the present invention including a plate, one or more chains, and multiple eyehooks and eyehook nuts. The plate has a central aperture sized to receive the elongated cylinder of the hose fitting, and multiple eyehook apertures along its perimeter each sized to receive the post of an eyehook.

In the method of the present invention the discharge valve is secured to a t-connection of a water line. The plate is then positioned about the elongated cylinder of the discharge valve so that the elongated cylinder extends through the central aperture of the plate, and the hose fitting cap may then be secured to the elongated cylinder. The chains are positioned over and about the water line, with each end of the chains received by one of the eyehooks, and each eyehook post positioned in an eyehook aperture of the plate. The eyehook posts are secured to the plate by means of the eyehook nuts. In this configuration the chain has a length sufficient to be positioned about and over the water line with the ends thereof received by the eyehooks, so that when the eyehook posts are secured to the plate by the eyehook nuts, the plate is securely positioned along the elongated cylinder, below the discharge valve nut.

The present invention also regards a system for securing a discharge valve to a water line of a fire suppression system. The system includes a plate, one or more chains, a plurality of eyehooks and a plurality of eyehook nuts. The plate has a central aperture sized to receive the elongated cylinder of the hose fitting of the discharge valve. The plate further has a plurality of eyehook apertures along its perimeter, each eyehook aperture sized to receive the post of an eyehook. The chain has a length sufficient to be positioned about and over the water line, with the ends thereof received by the eyehooks so that when the eyehook posts are secured to the plates by the eyehook nuts the plate is securely positioned along the elongated cylinder, below the discharge valve nut.

The present invention also regards a secured fire protection system. This system includes a water line having a plurality of t-connections and discharge valves. Each discharge valve includes a nut, a hose fitting, and a hose fitting cap. The system further includes a plate, one or more chains, a plurality of eyehooks and a plurality of eyehook nuts. The plate has a central aperture with a circumference sized to receive the elongated cylinder of the hose fitting. The plate further has a plurality of eyehook apertures along its perimeter, each eyehook aperture sized to receive the post of an eyehook. The discharge valve secures to a t-connection of a water line, the plate is positioned about the elongated cylinder of the discharge valve so that the cylinder extends through the central aperture of the plate, and the hose fitting cap is secured to the elongated cylinder. The chains are positioned about and over the water line, with each end of the chains received by one of the eyehooks. Each eyehook post is positioned in an eyehook aperture of the plate, and is secured to the plate by means of the eyehook nuts. The chain has a length sufficient to be positioned about the water line and received by the eyehooks so that when the eyehook posts are secured to the plates by the eyehook nuts, the plate is securely positioned along the elongated cylinder, below the discharge valve nut.

DETAILED DESCRIPTION OF THE PRESENT INVENTION

Figure 1:
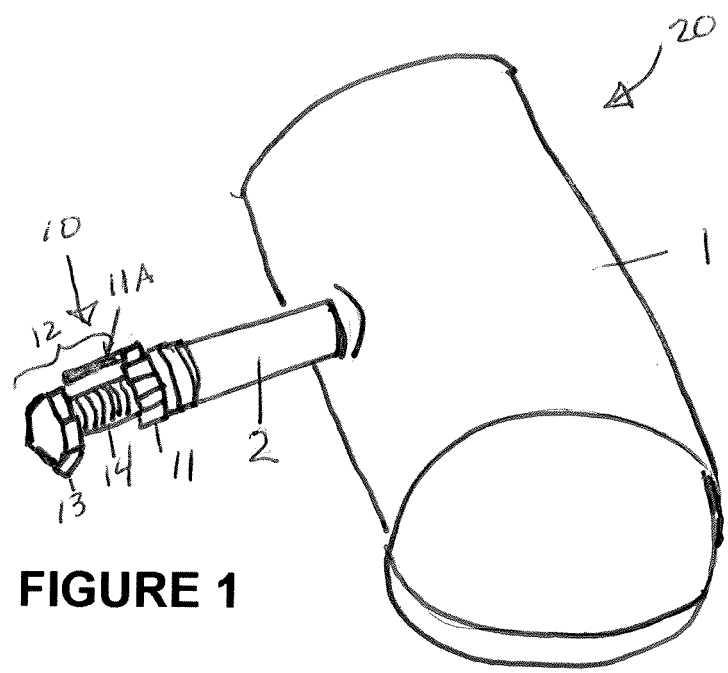
FIG. 1 is a peripheral view of a fine suppression system to which the system of the present invention is applicable.
Figure 2:
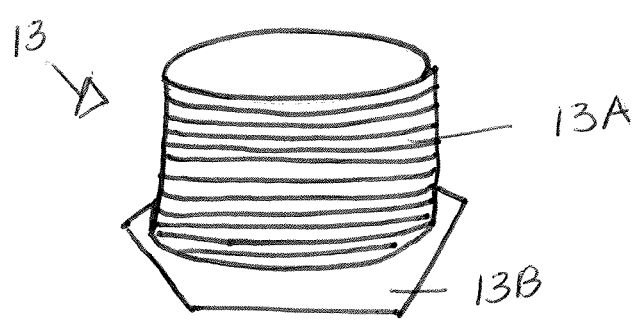
FIG. 2 is a peripheral view of the cap plate used in the fire suprression system shown in FIG. 1.

Referring to FIGS. 1-6, the present invention includes a method for securing a discharge valve 10 to a water line 1 of a fire suppression system 20 with multiple t-connections 2. The discharge valve 10 has a nut 11 with a circumference and a threaded interior surface, a hose fitting 12 having a circumference, wherein the hose fitting has an elongated cylinder 14 threaded along its exterior and interior surfaces. The discharge valve further includes a hose fitting cap 13, which has a post 13A threaded along its exterior, and a cap plate 13B affixed to an end of the post, wherein the cap plate has a circumference.

The discharge valve 10 is secured to the water line 1 by a plate 30, a chain 31, a plurality of eyehooks 32 and a plurality of eyehook nuts 33, each eyehook having a threaded post 32A, and each eyehook nut having a threaded interior surface to matingly engage with the threads of the post 32A. The plate has a perimeter and a central aperture 30A, wherein the central aperture 30A has a circumference smaller than each of the circumferences of the cap plate 13B and the nut 11, and sized to receive the elongated cylinder 14 of the hose fitting 12. In some embodiments the central aperture 30A of the plate has a threaded surface to matingly engage with the threaded exterior surface of the elongated cylinder 14; in some embodiments the central aperture 30A of the plate has a threaded surface to matingly engage with the threaded exterior surface of the hose fitting cap post 13A. The plate further has a plurality of eyehook apertures 30B along its perimeter, each eyehook aperture sized to receive the threaded post 32A of an eyehook 32.

Figure 3:
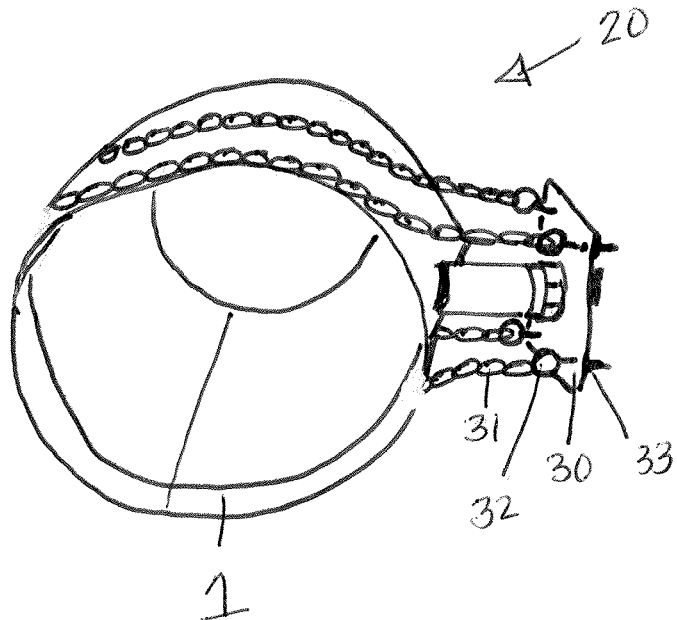
FIG. 3 is a peripheral view of an embodiment of the system of the present invention.
Figure 4:
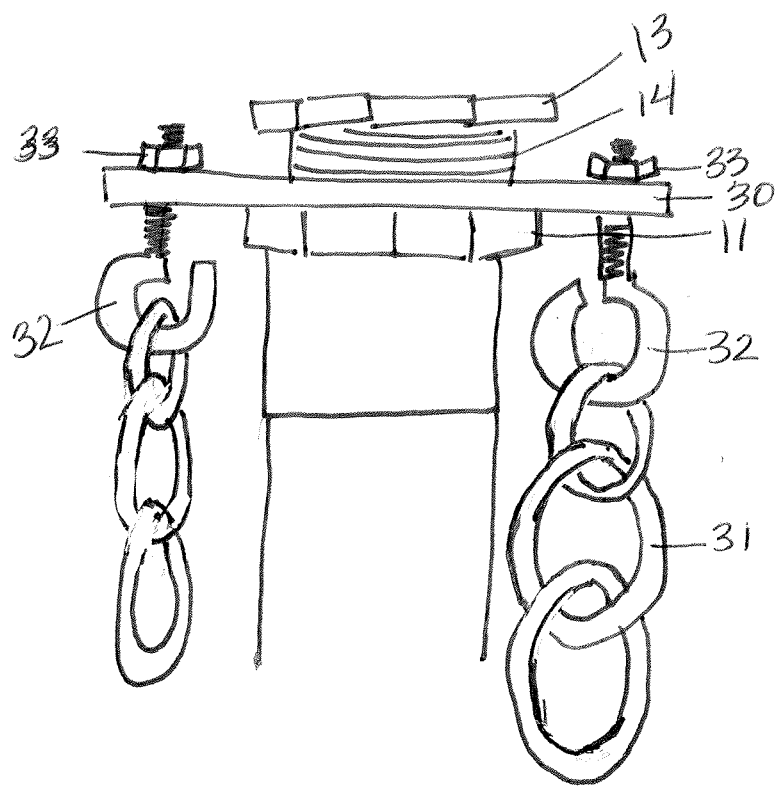
FIG. 4 is a side view of an embodiment of the assembly of the present invention.
Figure 5:
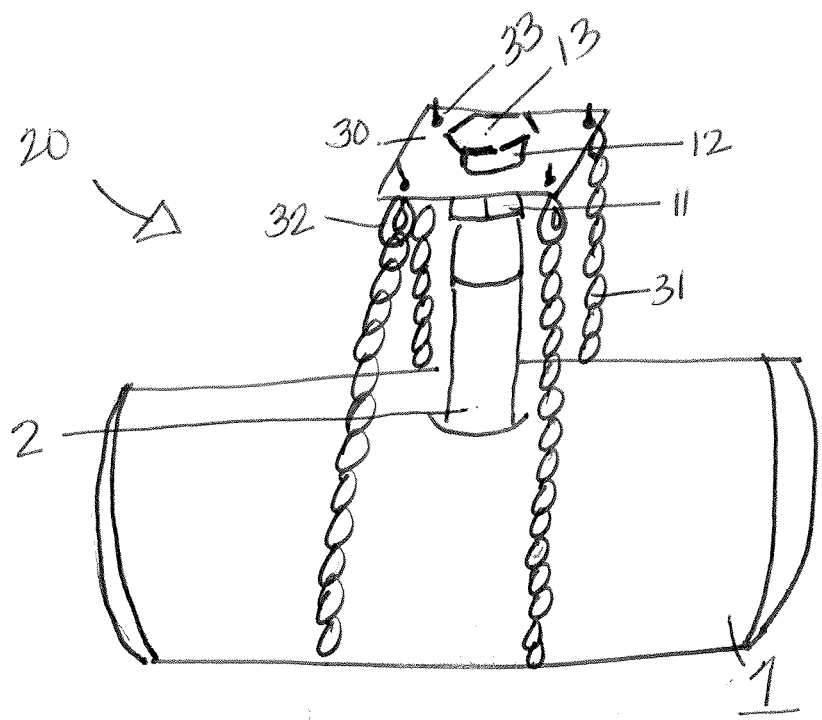
FIG. 5 is another peripheral view of an embodiment of the assembly of the present invention.
Figure 6:
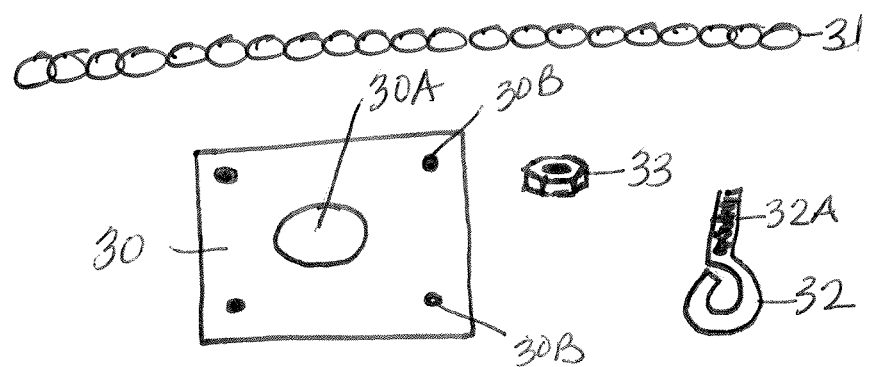
FIG. 6 is a view of various components of the assembly of the present invention.

A method of the present invention includes the steps of securing the discharge valve 10 to a t-connection 2 of a water line 1. The plate 30 is then positioned about the elongated cylinder 14 of the discharge valve 12 so that the cylinder extends through the central aperture 30A of the plate, and the hose fitting cap 13 is secured to the elongated cylinder 14, below the plate 30 (as shown in FIGS. 3-5). The chains 31 are positioned about and around the water line 1, with each end of the chains received by one of an eyehook 32. Each eyehook post 32A in positioned in an eyehook aperture 30B of the plate 30, and secured to the plate by means of an eyehook nut 33. In this method the chain has a length sufficient to be positioned about and over the water line 1 and received by the eyehooks 32 so that when the eyehook posts 32A are secured to the plate 30 by the eyehook nuts 32B, the plate 30 is securely positioned along the elongated cylinder 14, below the discharge valve nut 11.

Referring again to FIGS. 1-6, the present invention also regards a system for securing a discharge valve to a water line of a fire suppression system, where the water line has a plurality of t-connections. The discharge valve may be assembled as described in the method above. In an embodiment the system includes a plate 30, one or more chains 31, a plurality of eyehooks 32 and a plurality of eyehook nuts 33, each eyehook 32 having a threaded post 32A, and each eyehook nut 33 having a threaded interior surface for mating engagement with the threaded post 32A. The plate 30 has a perimeter and a central aperture 30A, wherein the central aperture has a circumference smaller than each of the circumferences of the cap plate and the nut of the discharge valve, and is sized to receive the elongated cylinder of the hose fitting. The plate 30 further has a plurality of eyehook apertures 30B along its perimeter, each eyehook aperture 30B being sized to receive the threaded post 32A of an eyehook 32. These apertures are positioned on the plate at a distance from the central axis of the central aperture 30A greater than the radius of the discharge valve nut 11 (to exterior surface), so that the chains do not touch the nut when the system of the present invention is secure on the discharge valve. Notably the plate is sized so that it does not interfere with the rotation of the lever 11A, allowing opening and closing of the valve 10. The chains 31 have a length sufficient to be positioned about and around the water line of the fire suppression system, and received by the eyehooks 32 so that when the eyehook posts 32A are secured to the plate 30 by the eyehook nuts 33, the plate is securely positioned along the elongated cylinder at the discharge valve nut.

The present invention also regards a secured fire protection system, portions of which are depicted in FIGS. 1-6. This system includes a water line 1 having a plurality of t-connections 2 and discharge valves 10. Each discharge valve 10 includes a nut 11, a hose fitting 12 and a hose fitting cap 13. The nut 11 has a circumference and a threaded interior surface; the hose fitting 12 also has a circumference and includes an elongated cylinder 14 threaded along its exterior and interior surfaces; and the hose fitting cap 13 has a post 13A threaded along its exterior (to matingly engage with the interior threading to the elongated cylinder 13), and a cap plate 13B affixed to an end of the post and having a circumference.

This secured fire protection system also includes plates 30, chains 31, eyehooks 32, and eyehook nuts 33. Each eyehook has a threaded post 32A, and each eyehook nut 33 has a threaded interior surface to matingly engage with the threading of the post 32A. The plate 30 has a perimeter and a central aperture 30A, wherein this central aperture has a circumference smaller than each of the circumferences of the cap plate and the nut of the discharge valve 10, and is sized to receive the elongated cylinder 14 of the hose fitting. The plate 30 further has a plurality of eyehook apertures 30B along its perimeter, each eyehook aperture sized to receive the threaded post 32A of an eyehook 32.

In this system each discharge valve 10 is secured to a t-connection of a water line 1. A plate 30 is then positioned about the elongated cylinder 14 of the discharge valve 10 so that the elongated cylinder passes through the plate's central aperture 30A, and the hose fitting cap 13 is secured to the elongated cylinder 14. Next, the chains 31 are positioned about the water line 1, with each end of the chains received by one of the eyehooks 32. Each eyehook post 32A is positioned in an eyehook aperture 30B of said plate, and secured to the plate by means of the eyehook nuts 33. The chain 31 has a length sufficient to be positioned about the water line 1 and received by the eyehooks 32 so that when the eyehook posts 32A are secured to the plates by the eyehook nuts 33, the plate is securely positioned along said elongated cylinder 14 below the discharge valve nut 11.

In some embodiments the plates of the foregoing methods, apparatus, and system is ¼" steel; the eyehooks are ½" eyehooks and the eyehook nuts are 1½" threaded screw nuts; and/or the chains are 1,200 psi steel. In some embodiments, the components are made from stainless steel, and may be powder coated. The plates may be rectangular in shape, or may assume another shape. The eyehook apertures 30B are in pairs, with the eyehook apertures of each pair being equidistant from the center axis of the central aperture 30A. In some embodiments the head of the eyehook is split so that a closed ring of the chain can be received thereby. In some embodiments the eyehook and nut securing configuration are replaced by an s-hook, with one end of said s-hook extending about an exterior edge of the plate 30A, and through the eyehook aperture 30B, and the other end engaged with an end of the chain 31.

Although the methods, system and assemblies for a fire suppression system and means to secure a discharge valve thereof have been described in the context of various aspects, features and embodiments, it will be apparent to those skilled in the art that the invention encompasses alternate embodiments, orientation of components, and/or methods of assembly, beyond the specifically disclosed embodiments. It is also contemplated that various combinations or substitution of equivalents of the disclosed components may be made within the scope of the present invention. Thus, it is intended that the scope of the present invention herein disclosed should not be limited by the particular disclosed embodiments described above for the purpose of fulfilling statutory requirements, but should be determined by a fair reading of the claims that follow.

The invention claimed is:
1. A method for securing a discharge valve to a water line of a fire suppression system, said water line having a plurality of t-connections, the method comprising the steps of:
  a. providing a discharge valve comprising
    i. a nut having a circumference and a threaded interior surface;
    ii. a hose fitting having a circumference, wherein said hose fitting comprises an elongated cylinder threaded along its exterior and interior surfaces;

iii. a hose fitting cap, wherein said hose fitting cap comprises a post threaded along its exterior, and a cap plate affixed to an end of said post, said cap plate having a circumference;
b. Providing a chain, a plurality of eyehooks and a plurality of eyehook nuts, each eyehook having a threaded post, and each eyehook nut having a threaded interior surface;
c. Providing a plate having a perimeter and a central aperture, wherein said central aperture has a circumference smaller than each of the circumferences of said cap plate and said nut, and sized to receive said elongated cylinder of said hose fitting, and said plate further having a plurality of eyehook apertures along its perimeter, each eyehook aperture sized to receive said threaded post of an eyehook;
d. Securing said discharge valve to a t-connection of a water line;
e. Positioning said plate about said elongated cylinder of said discharge valve, through said central aperture;
f. Securing said hose fitting cap to said elongated cylinder;
g. Positioning said chains about said water line, with each end of said chains received by one of said eyehooks;
h. Positioning each eyehook post in an eyehook aperture of said plate; and
i. Securing said eyehook posts to said plate by means of said eyehook nuts;

wherein said chain has a length sufficient to be positioned about said water line and received by said eyehooks so that when said eyehook posts are secured to said plate by said eyehook nuts, said plate is securely positioned along said elongated cylinder below said discharge valve nut.

2. The method of claim 1, wherein said valve discharge further comprises a rotatable lever, and wherein said plate is sized so that when positioned about said elongated cylinder, its outer edges do not interfere with rotation of the lever.

3. A system for securing a discharge valve to a water line of a fire suppression system, said water line having a plurality of t-connections, and said discharge valve comprising a nut having a circumference and a threaded interior surface, a hose fitting having a circumference, wherein said hose fitting comprises an elongated cylinder threaded along its exterior and interior surfaces, and a hose fitting cap, wherein said hose fitting cap comprises a post threaded along its exterior, and a cap plate affixed to an end of said post, said cap plate having a circumference, the system comprising:
a. a chain and a plurality of securing devices;
b. a plate having a perimeter and a central aperture, wherein said central aperture has a circumference smaller than each of the circumferences of said cap plate and said nut, and sized to receive said elongated cylinder of said hose fitting, and said plate further having a plurality of eyehook apertures along its perimeter, each eyehook aperture sized to receive and retain a portion of a said securing device, wherein said chain has a length sufficient to be positioned about said water line and received by said securing devices so that when said securing devices are secured to said plate, said plate is securely positioned along said elongated cylinder below said discharge valve nut.

4. The system of claim 3, wherein said securing devices comprise s-hooks.

5. The system of claim 3, wherein said securing device comprises a split eyehook and a nut, each correspondingly threaded to allow mating engagement thereof.

6. A secured fire protection system comprising:
a. a water line having a plurality of t-connections,
b. a discharge valve comprising
i. a nut having a circumference and a threaded interior surface;
ii. a hose fitting having a circumference, wherein said hose fitting comprises an elongated cylinder threaded along its exterior and interior surfaces;
iii. a hose fitting cap, wherein said hose fitting cap comprises a post threaded along its exterior, and a cap plate affixed to an end of said post, said cap plate having a circumference;
c. a chain, a plurality of eyehooks and a plurality of eyehook nuts, each eyehook having a threaded post, and each eyehook nut having a threaded interior surface;
d. a plate having a perimeter and a central aperture, wherein said central aperture has a circumference smaller than each of the circumferences of said cap plate and said nut, and sized to receive said elongated cylinder of said hose fitting, and said plate further having a plurality of eyehook apertures along its perimeter, each eyehook aperture sized to receive said threaded post of an eyehook;

wherein said discharge valve secures to a t-connection of a water line; said plate is positioned about said elongated cylinder of said discharge valve, through said central aperture; said hose fitting cap is secured to said elongated cylinder; said chains are positioned about said water line, with each end of said chains received by one of said eyehooks; each eyehook post is positioned in an eyehook aperture of said plate; and said eyehook posts are secured to said plate by means of said eyehook nuts; and wherein said chain has a length sufficient to be positioned about said water line and received by said eyehooks so that when said eyehook posts are secured to said plate by said eyehook nuts, said plate is securely positioned along said elongated cylinder below said discharge valve nut.

* * * * *